(12) United States Patent
Wray et al.

(10) Patent No.: US 8,612,755 B2
(45) Date of Patent: Dec. 17, 2013

(54) SECURITY POLICY IN TRUSTED COMPUTING SYSTEMS

(75) Inventors: Michael John Wray, Bath (GB); Richard B Stock, North Somerset (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3068 days.

(21) Appl. No.: 10/811,305

(22) Filed: Mar. 29, 2004

(65) Prior Publication Data
US 2004/0250110 A1 Dec. 9, 2004

(51) Int. Cl.
*H04L 9/32* (2006.01)

(52) U.S. Cl.
USPC .......................................................... 713/166

(58) Field of Classification Search
None
See application file for complete search history.

(56) References Cited

U.S. PATENT DOCUMENTS

| | | | |
|---|---|---|---|
| 7,216,369 B2* | 5/2007 | Wiseman et al. | 726/34 |
| 2002/0194496 A1* | 12/2002 | Griffin et al. | 713/200 |
| 2003/0097578 A1* | 5/2003 | England et al. | 713/191 |
| 2003/0229794 A1* | 12/2003 | Sutton et al. | 713/189 |
| 2004/0003288 A1* | 1/2004 | Wiseman et al. | 713/201 |
| 2004/0103299 A1* | 5/2004 | Zimmer et al. | 713/200 |

OTHER PUBLICATIONS

Grawrock, David. "TCPA Main Specification 1.1b." Feb. 22, 2002. pp. 1-23.*
Bajikar, Sundeep. "Trusted Platform Module (TPM) based security on Notebook PCs—White Paper." Jun. 20, 2002. Mobile Platforms Group, Intel Corporations. 20 pages. Retrieved from http://www.intel.com/design/mobile/platform/downloads/Trusted_Platform_Mobile_White_Paper.pdf.*

* cited by examiner

*Primary Examiner* — Yin-Chen Shaw
*Assistant Examiner* — Harris Wang

(57) ABSTRACT

A trusted computing platform includes one or more first logically protected computer environments (or "compartments") associated with initialization of the system, and one or more second logically protected computing environments (or "compartments"). The one or each second compartment is associated with at least one service or process supported by the said system. The trusted computing platform is loaded with a predetermined security policy including one or more security rules for controlling the operation of each of the compartments such that the security rules relating to the one or each first compartment is loaded onto the trusted computing platform when the system is initialized. The one or more security rules relating to the one or at least one of the second compartments are only loaded onto the trusted computing platform if one or more services or processes associated therewith are enabled.

10 Claims, 4 Drawing Sheets

SECURITY POLICY IN TRUSTED COMPUTING SYSTEMS

FIELD OF THE INVENTION

This invention relates to the security policy employed in trusted computing systems and, more particularly, to a method of and apparatus for loading the security rules making up a security policy of a trusted computing system.

BACKGROUND TO THE INVENTION

For commercial applications, a client computing platform typically operates in an environment where its behaviour is vulnerable to modification by local or remote entities. This potential insecurity of the platform is a limitation on its use by local parties who might otherwise be willing to use the platform, or remote parties who might otherwise communicate with the platform; for example, for the purposes of E-commerce.

The co-pending, commonly assigned application WO/48063, incorporated herein by reference, discloses a 'trusted computing platform' comprising a computing platform having a 'trusted component' including a built-in hardware and software component. This document describes the use of a Trusted Device (TD) or Trusted Platform Module (TPM) to enable verification of the integrity of computing apparatus by reliable measurement and reporting of integrity metrics. A TD/TPM conforms to the Trusted Computing Platform Alliance (TCPA) specification, see for example www.trustedpc.org.

A Trusted Device or Trusted Platform Module typically includes one or more logically protected computing environments or "compartments" within which a service or process can be run. The actions or privileges within a compartment are constrained, particularly to restrict the ability of a process to execute methods and operations which have effect outside the compartment, such as methods that request network access or access to files outside of the compartment. Also, operation of a process or service within a compartment is performed with a high level of isolation from interference and prying by outside influences. The or each compartment can be an operating system compartment controlled by an operating system kernel. This arrangement is referred to as a compartmented operating system or a trusted operating system.

Trusted operating systems have been available for several years in a form designed for handling and processing classified (military) information, using a containment mechanism enforced by a kernel of the operating system with mandatory access controls to resources of the computing platform such as files, processes and network connections. The operating system attaches labels to the resources and enforces a security policy which governs the allowed interaction between these resources based on their label values. Many trusted operating systems apply a security policy based on the Bell-Lapadula model discussed in the paper "Applying Military Grade Security to the Internet" by C I Dalton and J F Griffin published in Computer Networks and ISDN Systems 29 (1997) 1799-1808.

In any event, many trusted computing platforms adopt a relatively simple and convenient form of operating system compartment. As a general rule, each resource of the computing platform which is to be protected is given a label indicating the compartment to which that resource belongs. Mandatory access controls, incorporating a security policy, are performed by the kernel of the host operating system to ensure that resources from one compartment cannot interfere with resources from another compartment.

The above-mentioned security policy tends to be expressed in the form of security rules (each generally comprising an instruction line). In general, one or more security rules are associated with a compartment, and each compartment is associated with one or more services.

In the past, it has been considered desirable to load the security rules as early in the startup sequence of a platform as possible, so relevant security rules are in force as soon as a service or process is started. As such, in prior art systems, all security rules tend to be loaded to the platform at the time of system initialisation, i.e. a complete security policy is loaded at system startup.

However, this is not necessarily efficient, convenient or practical for a number of reasons. Firstly, some networking security rules use hostnames instead of numerical IP addresses, and hostname resolution does not tend to be available at startup, i.e. prior to the commencement of networking, so there is frequently not any available facility for looking up specified hostnames and translating them into the respective numerical IP addresses, such that there is no facility for recognising host names at that stage.

Further, some security rules refer to service ports which are allocated dynamically, i.e. a specific port may be allocated to a different service each time the system is initialised and/or a specific service may be allocated to a different port each time the system is initialised. In many cases, the port being used by a specific service will not be known until that service starts, i.e. after the startup process has been completed.

Still further, and notwithstanding the problems referred to above, most security rules relate to specific services, such that if the entire security policy is loaded at system startup, there will be a significant number of security rules loaded which relate to services that are not enabled. This is clearly an inefficient use of both processing power and memory capacity of the system.

DISCLOSURE OF THE INVENTION

We have now devised an arrangement which overcomes the problems outlined above. In accordance with one aspect of the present invention, there is provided a system comprising a trusted computing platform including one or more first logically protected computing environments (or "compartments") associated with initialisation of said system, and one or more second logically protected computing environments (or "compartments"), the one or more said second logically protected computing environment being associated with at least one service or process supported by said system, the system being arranged to load onto said trusted computing platform a predetermined security policy including one or more security rules for controlling the operation of each of said logically protected computing environments, such that said security rules relating to the one or more first logically protected computing environment is loaded onto said trusted computing platform when the system is initialised, and the one or more security rules relating to the or at least one of said second logically protected computing environments are only loaded onto said trusted computing platform if one or more services or processes associated therewith are enabled.

In accordance with another aspect of the present invention, there is provided a method of loading a security policy onto a system including a trusted computing platform, said trusted computing platform including one or more first logically protected computing environments (or "compartments") associated with initialisation of said system, and one or more second logically protected computing environments (or "compartments"), the one or each said second logically protected computing environment being associated with at least one service or process supported by said system, said security policy comprising one or more security rules for controlling the operation of each of said logically protected computing environments, the method including the steps of loading said security rules relating to the one or each first logically protected computing environment onto said trusted computing platform when the system is initialised, and loading the one or more security rules relating to the one or at least one of said second logically protected computing environments onto said trusted computing platform only if one or more services or processes associated therewith are enabled.

It will be appreciated that, in the context of the present document something that is "trusted" always behaves in the expected manner for the intended purpose.

Thus, the method and system of the present invention provide for the possibility of loading the security rules relating to a particular service or process (or the relevant compartment) only if that service or process (or compartment) is enabled or accessed. As such, few, if any redundant security rules are loaded during startup, and the opportunity is provided to load security rules after networking has begun, thereby enabling hostnames to be used within the security rules, which can be readily translated into the associated numerical IP addresses as required. Still further, the method and system of the present invention provide the opportunity to identify a port dynamically assigned to a particular service or process such that the relevant security rules associated therewith can be loaded accordingly.

It will be appreciated that one or more common variables can be provided for each compartment; for example, a DNS service (which translates hostnames to numerical IP addresses), or e-mail in respect of which the relevant security rules are only added if that variable is enabled for a particular compartment. Any one of a number of variables associated with a directory of plug-ins can be added. When a compartment is enabled, the system is preferably arranged to determine the status of these variables and cause the relevant plug-in(s) to run if an associated variable is 'true'. For example, if DNS=true, the associated plug-in runs and adds the relevant security rules, if DNS=not true, the associated security rules are not added.

BRIEF DESCRIPTION OF THE DRAWINGS

An embodiment of the present invention will now be described by way of example only and with reference to the accompanying drawings, in which.

DETAILED DESCRIPTION OF THE DRAWINGS

In the following description, numerous specific details are set forth in order to provide a thorough understanding of the present invention. It will be apparent, however, to one skilled in the art, that the invention can be practised without limitation to these specific details. In other instances, well known methods and structures have not been described in detail so as to avoid unnecessarily obscuring the present invention.

A trusted computing platform of a type generally suitable for carrying out an embodiment of the present invention is described in detail in the applicant's International Patent Application No. PCT/GB00/00528 entitled 'Trusted Computing Platform' and filed on 15 Feb. 2000, the contents of which are incorporated herein by reference. The PCT document describes the essential elements of a trusted computing platform, and its role in providing integrity metrics indicating the state of the computing platform to a user of that platform, and communication of such metrics to a user.

Figure 1:
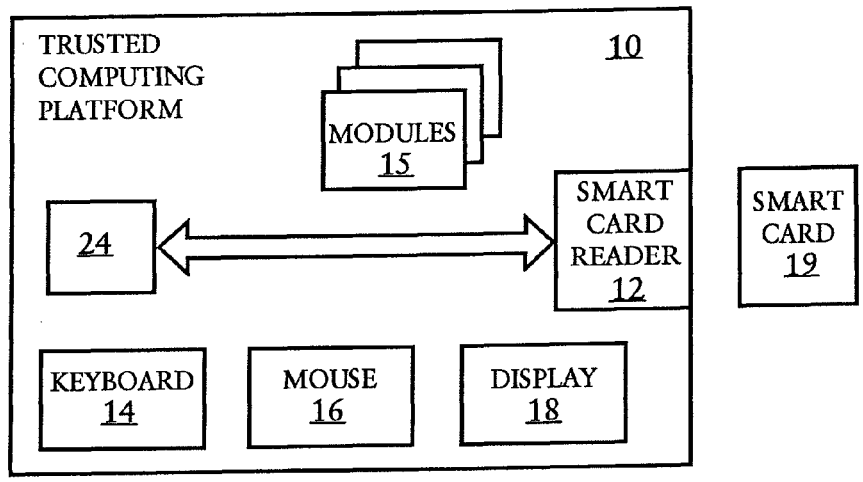
FIG. 1 is a diagram of a system capable of performing embodiments of the present invention.

Briefly, and referring to FIG. 1 of the drawings, a trusted computing platform 10 includes the standard features of a keyboard 14, a mouse 16 and a visual display unit (VDU) 18, which provide the physical 'user interface' of platform 10. This embodiment of trusted platform 10 also contains a smart card reader 12, although this is not essential in all embodiments of the present invention. Smart card reader 12 responds to smart card 19 when the smart card is physically coupled to the reader. Reader 12 and card 19 interact to provide trusted user interaction with the trusted platform 10, as described in the commonly assigned International Patent Application No. PCT/GB00/00751 entitled "Smartcard User Interface for Trusted Computing Platform" and filed on 3 Mar. 2000, the contents of which application are incorporated herein by reference. Platform 10 includes a plurality of modules 15: these are other functional elements of the trusted platform of essentially any kind appropriate to that platform (the functional significance of modules 15 is not relevant to the present invention and will not be discussed further herein).

Figure 2:
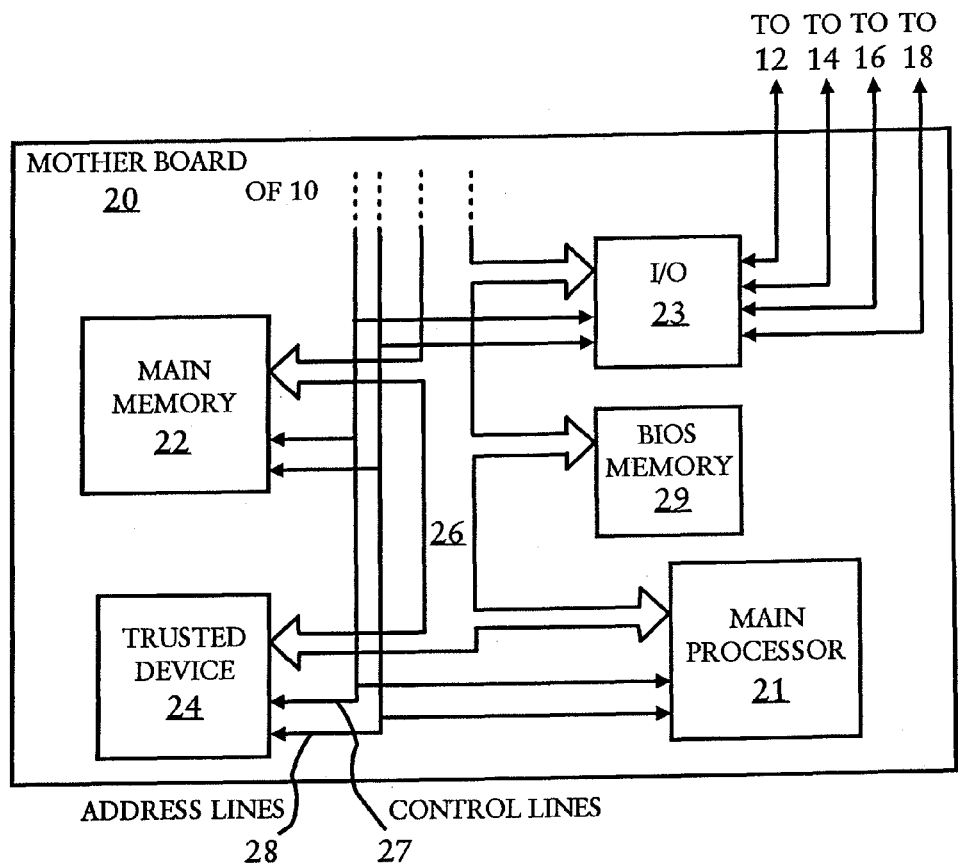
FIG. 2 is a diagram of a motherboard including a trusted device arranged to communicate with a smart card reader and with a group of modules.

Referring to FIG. 2 of the drawings, the motherboard 20 of the trusted computing platform 10 includes (among other standard components) a main processor 21, main memory 22, a trusted device 24, a data bus 26 and respective control lines 27 and address lines 28, BIOS memory 29 containing the BIOS program (which, after reset, builds a proper environment within which the operating system program will be run) for the platform 10, and input/output (I/O) device 23, which controls interaction between the components of the motherboard and the smart card reader 12, the keyboard 14, the mouse 16 and the VDU 18. The main memory 22 is typically random access memory (RAM). In operation, the platform 10 loads the operating system into RAM from hard disk (not shown).

Thus, after reset, the main processor 21 is initially controlled by the trusted device 24, which then hands control over to the platform-specific BIOS program in memory 29, which in turn initialises all input/output devices as normal. After the BIOS program has been executed, control is handed over to an operating system program, which is typically loaded into the main memory 22 from a hard disk drive (not shown). It is highly desirable for the BIOS boot block to be contained within the trusted device 24. Loading the BIOS boot block in trusted device 24 prevents (1) subversion of the obtaining of the integrity metric (which could otherwise occur if rogue software processes are present) and (2) rogue software processes from creating a situation in which the BIOS (even if correct) fails to build a proper environment for the operating system.

A preferred structure of the trusted device 24 is described in more detail in the above-mentioned International Patent Application No. PCT/GB00/00528. The specific structure of the trusted device is not relevant to the present invention and is not discussed further herein.

Trusted computing platform 10, once started, tends to have a compartmented or trusted operating system. This means that one or more services or processes required to be supported by the operating system are run within a compartment which is a logically protected computing environment. As stated above, the actions or privileges within a compartment are constrained (by the security policy), particularly to restrict the ability of a process to execute methods and operations which have an effect outside the compartment, such as methods that request network access or access to files outside of the compartment. In addition, operation of the process within the compartment is performed with a high level of isolation from interference and prying by outside influences.

In a preferred embodiment, the compartment is an operating system compartment controlled by the operating system kernel and, as stated above, this is also referred to as a compartmented operating system or a trusted operating system.

Communication between compartments and network resources is provided via narrow kernel level controlled interfaces to a transport mechanism such as TCP/UDP. Access to these communication interfaces is governed by rules specified on a compartment by compartment basis. At appropriate points in the kernel, access control checks are performed, such as through the use of hooks to a dynamically loadable security module that consults a table of rules indicating which compartments are allowed to access the resources of another compartment. In the absence of a rule explicitly allowing a cross compartment access to take place, an access attempt is denied by the kernel. The rules enforce mandatory segmentation across individual compartments, except for those compartments that have been explicitly allowed to access another compartment's resources.

Figure 3:
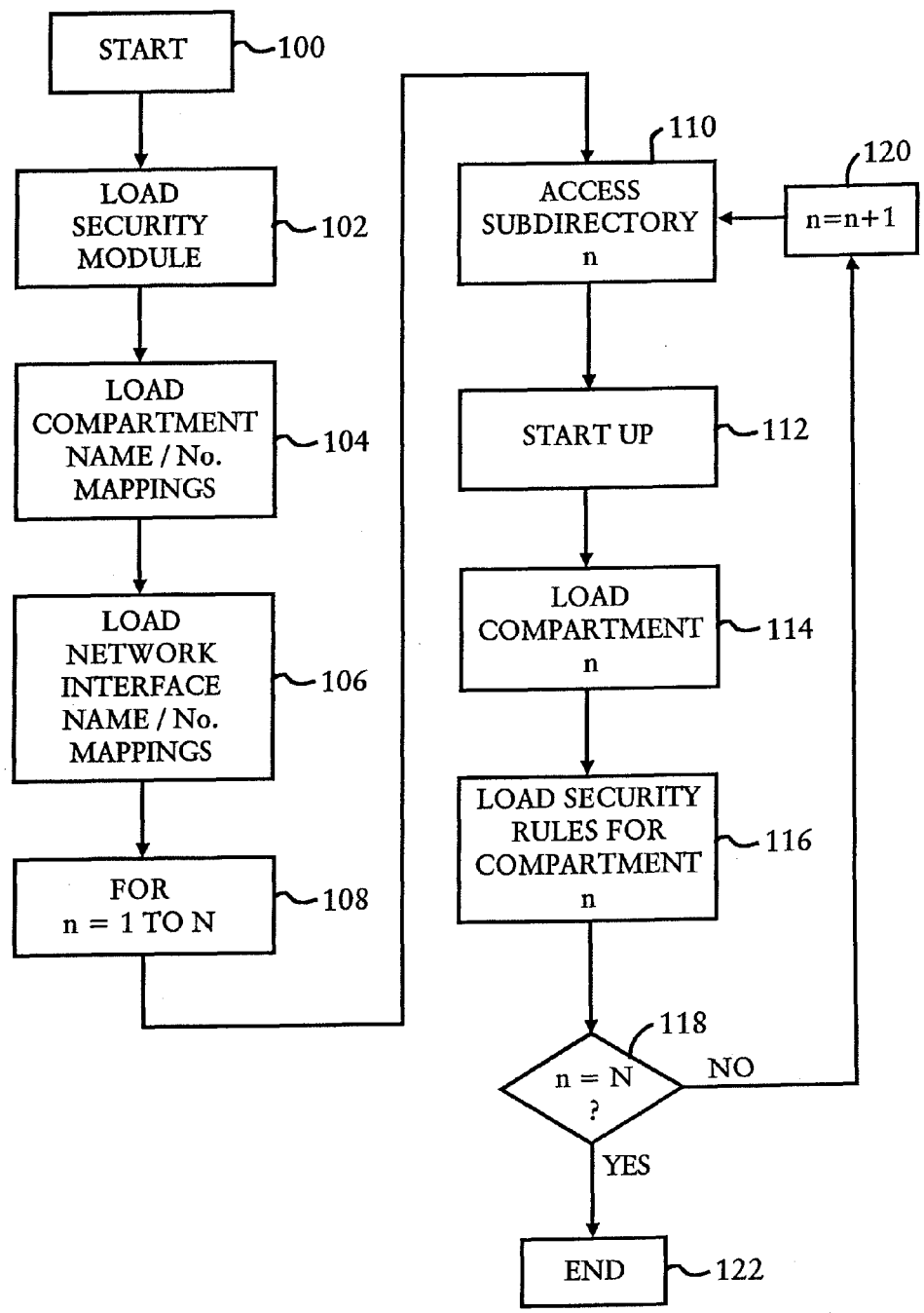
FIG. 3 is a flow diagram of a prior art method.

In accordance with the prior art, as illustrated in FIG. 3, the platform startup mechanism combined (1) starting of processes and (2) loading of compartments and their filesystem and communication rules into a single mechanism, commonly referred to as starting a compartment. FIG. 3 is an exemplary (simplified) prior art method of compartment startup.

At the start step 100, a script is run to load the security module during step 102, followed by steps 104 and 106 during which first and second input files are loaded into memory. The first input file includes the compartment name and compartment number mappings, while the second output file includes the network interface name and network interface number mappings. Another script is then run which is a simple "for loop" (starting at step 108) which iterates through a directory containing a number of subdirectories, one for each compartment configured on the system. Thus, for n=1 to N (where N is the total number of compartments configured on the system), subdirectory n is accessed (at step 110) and a script called "startup" is called (at step 112). The startup script causes the compartment n to be loaded (at step 114) and then causes the security rules required of compartment n to be set (at step 116). The startup script is the main controller of a compartment's security context. In more detail, the first thing the start script does, in this exemplary embodiment of the prior art, is to set a lock file. The start script then loads the access control communication rules, and then starts the daemon with the required compartment label.

After step 116, the process determines (at step 118) whether the "for loop" steps described above have been performed in respect of all N subdirectories. If not, n is incremented by 1 (at step 120) and steps 110 to 116 are repeated for the next subdirectory, otherwise the process ends (at step 122).

Thus, rules are associated with a compartment, and each compartment is associated with one or more services. In the case of the prior art, as described above, all of the compartments configured on the system and their associated security rules are loaded at system initialisation time, irrespective of whether any of the services associated with those compartments are started. This is considered to be disadvantageous for the reasons outlined above.

Figure 4A:
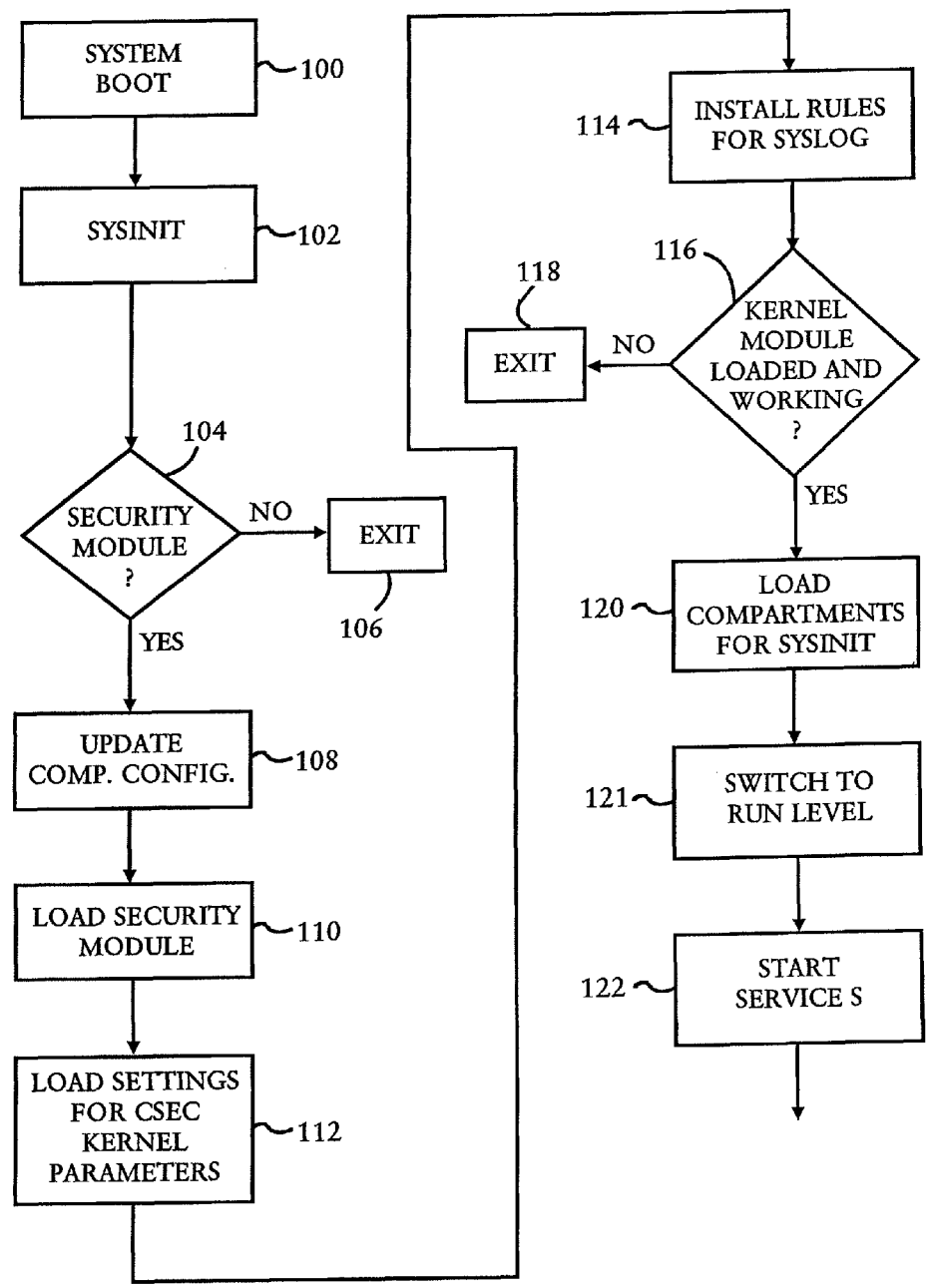
FIGS. 4A and 4B, together, are a flow diagram of a method according to a preferred embodiment of the present invention.
Figure 4B:
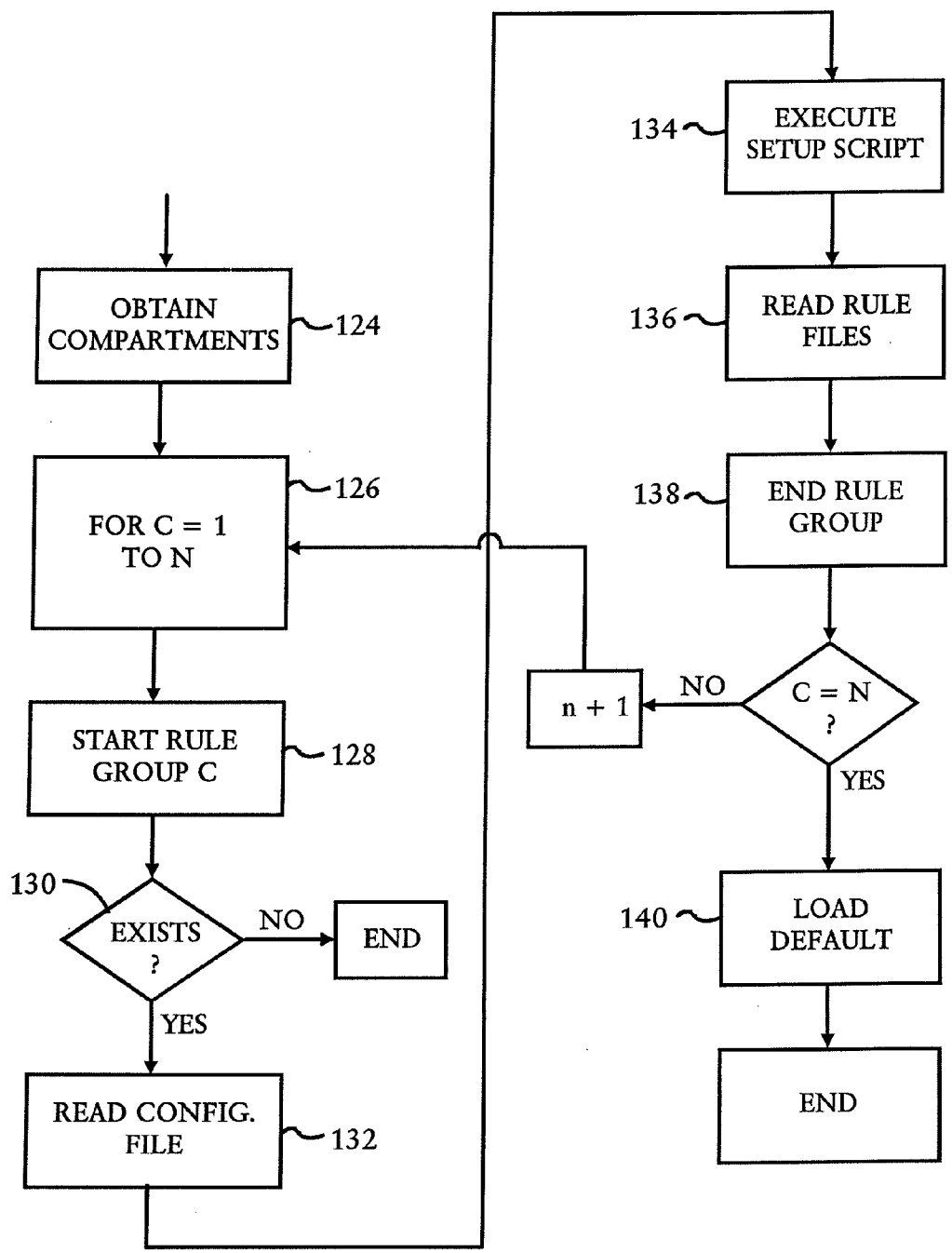

Thus, in accordance with an exemplary embodiment of the present invention, and with reference to FIG. 4 of the drawings, at the start, the system is booted (at step 100) and then a system initialisation process is run (at step 102). The system then determines, at step 104, if the security module is available for the running kernel, and exits (at step 106) if not. If the security module is determined to be available, the system performs a process to update the compartment configuration at step 108. During step 108, the system reads the compartment configuration files and saves information about which compartments should be loaded for which services for later use.

At step 110 the security module is loaded and at step 112 the settings for the kernel parameters are loaded. These parameters control rule logging and whether rules are enforced or not.

At step 114, some rules are loaded to allow certain programs, such as system login, to work, so that standard facilities for running commands will work. The system then determines whether or not the kernel module is loaded and working (at step 116) and logs an error and exits if not (at step 118). If the kernel module is determined to be loaded and working, the system loads the compartments associated with system initialisation (at step 120).

The system then switches (at step 121) to a predetermined run-level (which is simply a number 0-6, in this case, telling the initialisation process which programs to run). When a service S is started, at step 122, the system obtains a list of the compartments configured for S (at step 124) and ensures that the name of each compartment directory is registered with the kernel as a compartment (the directory called 'default' is ignored at this stage). For each configured compartment C, as determined during step 126, the system starts a rule group called C (step 128), determines whether or not the rule group exists (step 130) and, if so, reads a configuration file to install the configuration variables in the environment and execute any plugins that are enabled (step 132).

The system then (1) executes a setup script (at step 134) providing the system with the service and compartment names, (2) reads an appropriate rules file (at step 136) and (3) ends the rule group at step 138. When this process has been performed for all compartments N, the default directory is loaded (at step 140). Hence, the default directory is always loaded last, whereas other compartment directories are loaded in alphabetical order.

The 'rule groups' of this exemplary embodiment of the invention are used for two purposes:
1. The rules in a group are labelled with the group name for easy reference; and
2. The rules in the group replace all rules in the kernel labelled with the group name when they are loaded. Rules labelled with other group names, or unnamed rules, are left alone. This means that the system enables a process to be used to replace the rules for compartments configured for service S, leaving all other compartment rules alone.

Thus, in summary, at system initialisation time, the compartments associated with system initialisation (or "sysinit") are loaded. Later, the compartments associated with a service are loaded when (and if) the service starts. Compartments may be loaded before a service starts, or after a service starts with a file rule of the form <service>-post, where <service> is the name of the service they are to run after. Apart from the special service "sysinit", service names are the names of service start scripts.

As described above, a directory is provided which contains a number of subdirectories, one for each compartment configured on the system. The name of the subdirectory is the name of the compartment, and all compartments are defined before any compartments are loaded. The compartment subdirectory, /etc/tlinux/init/<comp> where <comp> is the compartment name, can contain the following files:

<comp>.cfg: compartment configuration file (defines the values of configuration variables, one of which variables defines the service(s) the compartment is associated with)

<comp>.setup: shell script run when the compartment is loaded

<comp>.rules: file of rules to load when the compartment is loaded

<comp>.rules-post: files of rules to load when the compartment is loaded for a-post service All the files are optional. When a compartment is loaded, the following actions are taken:
1) If present, <comp>.cfg is read into the environment
2) If present and executable, <comp>.setup is run
3) If present, <comp>.rules is loaded
4) If the service ends in -post, <comp>.rules-post is loaded if present Compartment loading is controlled by a script which replaces the startup directive of the prior art system. This is done by editing the startup script to use this new script instead of the previous startup directive for starting services for a runlevel. The initialisation script is called by a sysinit line in the startup script. The new script (1) performs substantially the same functions as the startup directive of the prior art, in that it starts the services configured for runlevel, and (2) calls 'tlinit<service>' before starting a service and 'tlinit<service>-post' after starting a service. The program tlinit then loads the compartments associated with the given service (if any). Before loading any compartments, tlinit ensures that all compartment names are registered. This allows rules for a compartment to refer to the names of other compartments without concern for load order. In this exemplary embodiment of the invention, compartments are loaded in alphabetical order. The only exception to this might be the compartment directory 'default' which contains default rules applying to all compartments. No compartment 'default' is registered, and the rules in the default directory are loaded last.

An embodiment of the present invention has been described by way of example only, and it will be apparent to persons skilled in the art that modifications and variations can be made to the described embodiment without departing from the scope of the invention as defined by the appended claims.

The invention claimed is:

1. A system comprising a trusted computing platform including:
   at least one first logically protected computing compartment associated with initialization of said system, and
   at least one second logically protected computing compartment, each second logically protected computing compartment being associated with at least one service or process supported by said system,
   wherein the system is arranged to load onto said trusted computing platform a predetermined security policy including at least one security rule for controlling the operation of each of said logically protected computing compartments;
   wherein the security rule relating to the at least one first logically protected computing compartment is arranged to be loaded onto said trusted computing platform when the system is initialized,
   wherein the at least one security rule relating to the at least one second logically protected computing compartment is only arranged to be loaded onto said trusted computing platform if one or more services or processes associated therewith are enabled,
   wherein one or more common variable is defined for each compartment, and wherein a relevant security rule is only arranged to be added if the variable associated with a particular compartment is enabled.

2. A system according to claim 1, wherein at least one variable associated with a directory of plug-ins is arranged to be added.

3. A system according to claim 2, wherein the system is arranged to determine, in response to a compartment being enabled, a status of said at least one variable and cause a relevant plug-in based upon the directory of plug-ins to run only if an associated variable is 'true'.

4. A system according to claim 3, wherein the at least one compartment includes an operating system compartment arranged to be controlled by the operating system kernel.

5. A system according to claim 4, wherein the at least one compartment and network resources are arranged so communication between them is provided via relatively narrow kernel level controlled interfaces to a transport mechanism.

6. A system according to claim 5, wherein said communication is governed by rules specified on a compartment by compartment basis.

7. A system according to claim 6, including means for determining when a service is starting, and on being enabled, for loading the compartment associated with that service and loading the at least one security rule associated with that service.

8. A system according to claim 7, including means for determining when a service starts, and causing the at least one security rule to be loaded accordingly.

9. A system according to claim 1, wherein the at least one compartment includes an operating system compartment arranged to be controlled by the operating system kernel.

10. A system according to claim 1, including means for determining when a service is starting, and on being enabled, for loading the compartment associated with that service and loading the security rules associated with that service.

* * * * *